INVENTOR.
KENNETH W. COWANS,
BY Robert Thompson
ATTORNEY.

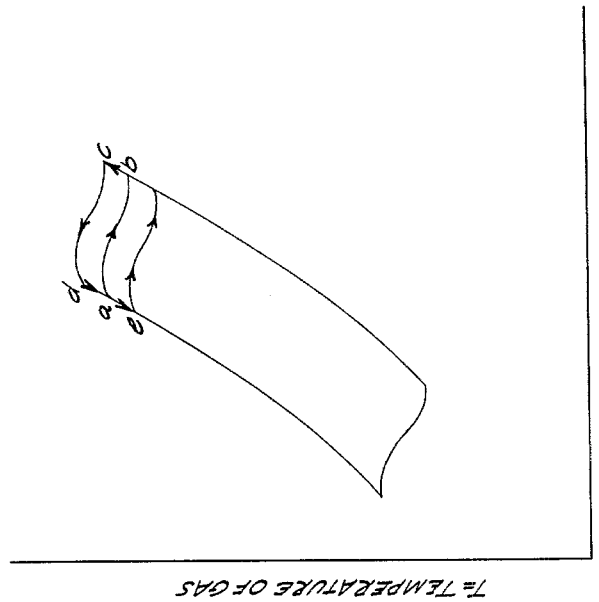
FIG. 2.
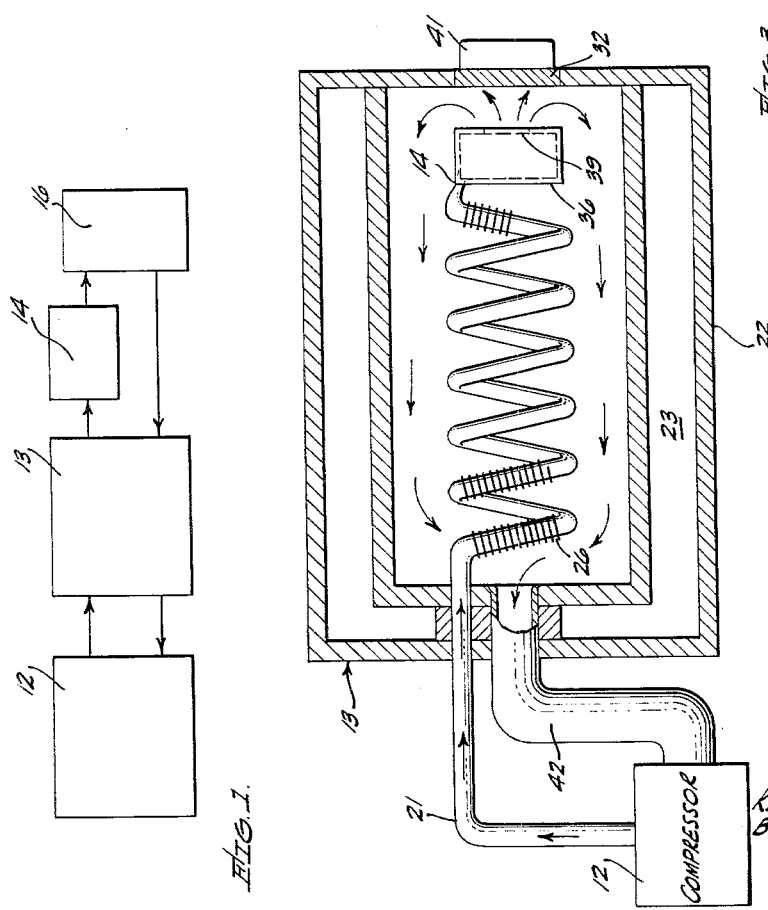
FIG. 3.
FIG. 1.

United States Patent Office 3,229,470
Patented Jan. 18, 1966

3,229,470
VORTEX THROTTLE AND CRYOSTAT
Kenneth W. Cowans, Playa Del Rey, Calif., assignor to Hughes Aircraft Company, Culver City, Calif., a corporation of Delaware
Filed July 14, 1964, Ser. No. 382,462
9 Claims. (Cl. 62—5)

This invention relates to an improved Joule-Thomson refrigerator and more particularly to an improved throttling device for cryogenic gases which are subjected to high pressures and low flow rates.

Heretofore, in throttling high pressure gases at low flow rates, the problem of plugging or clogging of the throttle has been very troublesome. This plugging occurred in the small cross-sectional area through which the gas flow was restricted during either a sonic throttling or a friction throttling process. The conventional sonic throttling process was accomplished by necking down or restricting the flow area such that the desired mass flow passed through a throat portion at a velocity of mach 1, the area size being fixed by the gas parameters. In friction throttling the gas was forced to flow through a long, narrow path so that the pressure drop undergone by the gas was sufficient to fall with a desired pressure range at a desired flow rate.

At high pressures and low flow rates the geometrics and sizes of the gas flow paths required to accomplish these two conventional throttling methods was very small, so small in fact that very minute foreign particles in the gas could seriously impede the flow. For example, to throttle nitrogen gas from a pressure above 100 atmospheres to a pressure of 1 atmosphere at a flow rate of 10 standard liters per minute a restriction no greater than 2 to 3 mils in diameter would be required for sonic throttle. For friction throttling, with the above gas conditions, a tube having a passageway 8 mils in diameter and about two to three feet long would be required.

Although the problem of plugging or stopping was troublesome enough at ordinary operating temperatures, the problem was greatly increased at cryogenic temperatures. At cryogenic temperature there was not only a greater chance of freezing or solidifying any gas impurities such as $CO_2$, oil, vapor, etc., which were unavoidably intermixed with the gas, but there was also a necessity of further reducing the diameter of the throttling passageway or restrictions since the area required to throttle a given gas mass decreases in direct proportion to the square root of the absolute temperature of the gas.

Merely increasing the area of the throttle, or even leaving the end of a gas supply tube open, would decrease the probability of plugging. However, this approach would also increase the flow rate and also reduce the amount of refrigeration available.

Accordingly, it is an object of this invention to provide a small, lightweight Joule-Thomson cryostat which will not block or clog at cryogenic temperatures.

Another object is to provide an improved gas throttle which will not plug or clog during operation down into the cryogenic temperature ranges.

Still another object is to provide a supersonic throttle which is capable of throttling gases from a high pressure to a low pressure at low mass flow rates without clogging at cryogenic temperatures.

Yet another object is to provide a compact throttle in which the gas throttling is achieved without the need for severely restricting the gas flow path.

The above and other objectives of this invention are accomplished by providing a closed cycle cryostat including a countercurrent heat exchanger having a gas inlet pipe and a volute chamber connected to one end of the pipe. Pressurized gas, such as nitrogen at between 100 and 200 atmospheres, flows through the inlet line and enters the volute chamber tangentially, whereupon the gas is accelerated into a vortex within the chamber. Eventually, the gas escapes axially from the volute chamber at an outlet port in a side wall of the chamber which spans the low pressure, supersonic vortex of the gas. Because of the Joule-Thompson effect, the temperature of the gas at the low pressure vortex is lower than the temperature of the high pressure gas initially fed tangentially into the chamber. The low temperature gas which escapes through the outlet port is directed against a radiator surface, thereby cooling the surface and providing refrigeration. The cool-low pressure gas is drawn back from the radiator surface and is continuously withdrawn from the heat exchanger flowing over the outside surface of the inlet pipe in a counter-current gas flow. This counter-current gas flow continuously decreases the temperature of the high pressure input gas flowing through the inlet pipe and in turn results in a continuously decreasing temperature at which the low pressure gas escapes from the vortex chamber until eventually a low temperature limit is reached.

Other objects, features and advantages of this invention will become apparent upon reading the following detailed description of one embodiment of the invention and referring to the accompanying drawings in which:

FIG. 1 is a functional block diagram of a closed cycle Joule-Thomson cryostat embodying the operation of this invention;

FIG. 2 is a graph illustrating the temperature vs. entropy effects on the gas during operation of the cryostat of FIG. 1;

FIG. 3 is a side view, partly in cross-section, of a Joule-Thomson cryostat embodying the features of the invention;

Figure 4:
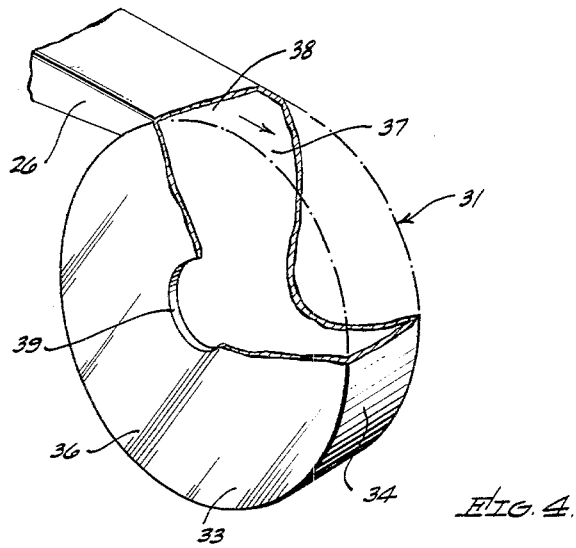
FIG. 4 is a perspective view of an improved throttle valve used with the cryostat and having a portion thereof broken away to show the valve interior.
Figure 5:
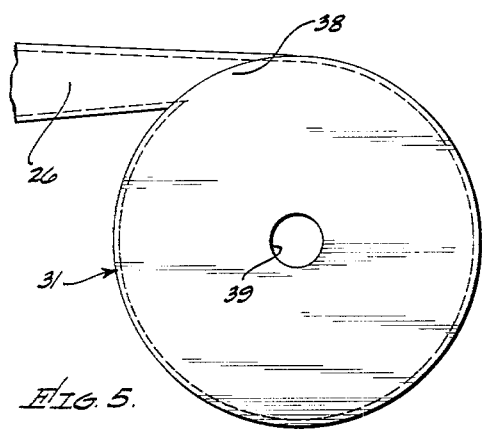
FIG. 5 is a side elevational view of the throttle valve with hidden edges shown by a broken line representation.

Referring to FIG. 1 there is illustrated a functional block diagram of a Joule-Thomson cryostat. In this cryostat, a compressor 12 supplies pressurized gas, such as nitrogen, to a counter-current heat exchanger 13 whereupon the gas output from the heat exchanger is applied to a throttle valve 14. In the throttle valve 14, the gas expands thereby decreasing in temperature, whereupon the cool expanded gas is directed to cool a heat load 16. The expanded cool gas is thereafter returned from the heat load 16 to the counter-current heat exchanger 13 whereupon it cools the high pressure input gas. Eventually, during continued cyclic operation, the temperature of the throttled gas approaches very near to the temperature of liquid nitrogen (77° K. at 1 atmosphere).

This cyclic operation is graphicaly illustrated in FIG. 2 in which the high pressure gas is expanded in the throttle valve 14 to reduce the gas temperature (points "a" to "b" of the graph). This expanded low temperature gas is then directed from the throttle valve 14 to the heat load 16, whereupon when the gas strikes the heat load 16, heat is transferred to the gas and the temperature rises a predetermined amount ("c" to "d"). The gas is then transferred back through the counter-current heat exchanger 13, whereupon a certain amount of the heat in the incoming high pressure gas is transferred to the relatively cooler expanded gas, thereby heating the expanded gas a certain amount while at the same time cooling the high pressure input gas ("d" to "e"). Thereafter, the expanded gas is withdrawn from the countereurrent heat exchanger 13 and drawn into the compressor 12, compressed to a high pressure and again cycled through the cryostat. During each progressive cycle the gas temperature of the nitrogen gas incrementally decreases until eventually a temperature is reached which is at about the temperature of liquid nitrogen.

Referring now to the details of the cryostat, FIG. 3 illustrates a conventional high pressure compressor 12 which, for example, is capable of compressing the gas from about one atmosphere to between 100 and 200 atmospheres and continuously supplying the compressed gas to the counter-current heat exchanger 13 at about 10 standard liters per minute through a thermally-insulated supply line or feed conduit 21. A compressor which will perform the above function is described in "Compact Joule-Thomson Refrigeration System 15° K.–60° K." printed in vol. 6 of Advances in Cryogenic Engineering, pp. 73–81, published by Plenum Press (1961).

The countercurrent heat exchanger 13 is enclosed within a Dewar flask 22 of the type having an annular vacuum chamber 23 formed between a cylindrical outer wall and a cylindrical inner wall. The heat exchanging portion of the device is mounted to extend axially within a central storage chamber of the Dewar flask.

Referring now to the heat exchanging portion of the device, a length of spirally wound, small diameter tubing 26 is connected to receive pressurized gas from the input conduit 21. The outer surface of this tubing can be formed with a plurality of spaced apart heat transfer fins which project radially outward therefrom. For purposes of convenience only a short length of the tubing 26 has been illustrated as being finned, but it should be understood that the entire length thereof is finned. Heat transfer from the tubing could also be increased by increasing the length of the spiralled tubing 26 such as by increasing the diameter of the spirals or decreasing the pitch of each coil to thereby compact the coils more closely. In operation, gas received from the input conduit 21 is fed through the spiralled tubing 26 to the throttle valve 14.

At the throttle valve 14, the pressure of the gas is reduced thereby decreasing the gas temperature, whereupon the cooled gas is directed against a radiator plate 32 made of an efficient heat conducting material. Referring now to the details of the throttle valve as illustrated in FIG. 4, one end of the spiralled gas supply tubing 26 is flattened to provide a rectangular passageway for a gas input connection to a volute chamber 33. The volute chamber 33 includes a cylindrical side wall 34 interconnected between a pair of flat, circular end walls 36 and 37. A rectangular gas inlet slot 38 is formed through the cylindrical side wall 34 at the flattened tubing 26 to provide a passageway which tangentially intercepts and communicates with the cylindrical inner surface of the side wall. As a result of this tangential relationship between the inlet slot 38 and cylindrical side wall 34 the high pressure gas flowing through the inlet slot is accelerated into a vortex within the volute chamber. A circular outlet port 39 is concentrically formed in one flat side wall 36 of the volute chamber so that the accelerated gas in the vicinity of the vortex can escape, thereby permitting a continuous tangential input of the high pressure gas. The diameter of the outlet port 39 should only be sufficient to span the supersonic vortex region of the accelerated gas within the volute chamber. By so spanning only the supersonic region it is possible to obtain a relatively lower mass flow through a relatively large aperture than would be possible at the sonic and subsonic ranges.

In addition, the gas pressure at the supersonic vortex region is substantially lower than the gas pressure in the vicinity of the tangential input slot. As a result of the pressure drop the gas temperature drops so that the gas that escapes through the output port 39 will have a lower temperature than the input gas. This temperature drop is commonly known as the Joule-Thomson effect. When the gas is outside the volute chamber the velocity is subsonic.

An important advantage of this volute chamber 33 is that the size of the input slot 38 and the outlet port 39 are much greater than the size of the gas passageway in a conventional sonic throttle of a friction throttle. In one embodiment which has been built the rectangular input slot 39 has a height of .015 inch and a width of .015 inch. The width and the diameter of the volute chamber 34 are .015 and .5 inch, respectively, and a diameter of the outlet port 39 of .025 inch. This throttle received nitrogen gas at a flow rate of 10 standard liters per minute at a pressure of 200 atmospheres and reduced the gas pressure to one atmosphere. The lower temperature of the expanded gas escaping through outlet port 39 eventually stabilized at around the temperature of liquid nitrogen, 77° K.

Referring back to FIG. 3 the low pressure gas which escapes through the outlet port 39 acts as a coolant to continuously cool one side of the efficient heat conducting radiator 32. As a result a heat load 16 mounted on the opposite side of the radiator plate 32 is continually cooled.

After the expanded gas is deflected from the radiator plate 32 it is withdrawn or exhausted from the heat exchanger in a countercurrent flow which is opposite the direction of flow of the input gas. As the expanded cool gas flows back over the surface of the spiralled input tube 26 heat is transferred from the relatively warm input gas contained within the tube to the cooler expanded gas thereby warming the expanded gas slightly while cooling the input gases. The expanded gases are thereafter continuously exhausted from the heat exchanger chamber through a thermally insulated exhaust conduit 42 and drawn back into the compressor 12.

While the salient features of the invention have been illustrated and described with respect to particular embodiments, it should be readily apparent that numerous modifications may be made within the spirit and scope of the invention and it is therefore not desired to limit the invention to the exact details shown.

What is claimed is:

1. A closed cycle Joule-Thomson cryostat comprising: a compressor having an inlet and an outlet, said compressor continuously drawing, compressing, and exhausting a supply of gas; a heat exchanger connected to receive compressed gas from the outlet of said compressor and to supply expanded gas to the inlet of said compressor; a heat load connected in thermal communication with said heat exchanger at an end opposite the compressor connection; and a throttle valve mounted adjacent the heat load, said throttle valve including a volute chamber having a gas inlet passageway formed through the side wall thereof and a gas outlet port formed in one end wall thereof, said volute chamber being connected to receive the compressed gas from said heat exchanger at the inlet passageway and to exhaust the gas through the outlet port whereby the gas within said volute chamber is accelerated into a vortex to reduce the gas pressure and gas temperature whereupon the low-pressure, low-temperature gas is directed outward from said volute chamber through the outlet port and against said heat load whereafter said heat load is cooled by the low-pressure, low-temperature gas, said gas thereafter being drawn back through said heat exchanger to the compressor input.

2. A closed cycle Joule-Thomson cryostat comprising: a compressor having an inlet and an outlet, said compressor continuously drawing, compressing, and exhausting a supply of gas; a countercurrent heat exchanger connected to receive compressed gas from the outlet of said compressor and to supply expanded gas to the inlet of said compressor; a heat load connected in thermal communication with said countercurrent heat exchanger at an end opposite the compressor connection; and a throttle valve mounted adjacent the heat load, said throttle valve including a volute chamber having a gas inlet passageway formed through the side wall thereof and a gas outlet port formed in one end wall thereof, said volute chamber being connected to receive the compressed gas from said heat exchanger at the inlet passageway and to exhaust the gas through the outlet port whereby the gas within said volute chamber is accelerated into a vortex to reduce the gas pressure and gas temperature whereupon the low-pressure, low-temperature gas is directed outward from said volute chamber through the outlet port and against said heat load whereafter said heat load is cooled by the low-pressure, low-temperature gas, said gas thereafter being drawn back through said countercurrent heat exchanger to the compressor input to cool the incoming high pressure gas.

3. A closed cycle Joule-Thomson cryostat comprising: a compressor having an inlet and an outlet, said compressor continuously drawing, compressing, and exhausting a supply of gas; a countercurrent heat exchanger connected to receive compressed gas from the outlet of said compressor and to supply expanded gas to the inlet of said compressor; a heat load connected in thermal communication with said countercurrent heat exchanger at an end opposite the compressor connection; and a throttle valve mounted adjacent the heat load, said throttle valve including a cylindrical volute chamber having a gas inlet slot formed through the side wall to tangentially intercept the inner side wall thereof and a gas outlet port formed in one end wall thereof, said volute chamber being connected to receive the compressed gas from said heat exchanger at the inlet passageway and to exhaust the gas through the outlet port whereby the gas within said volute chamber is accelerated into a vortex to reduce the gas pressure and gas temperature whereupon the low-pressure, low-temperature gas is directed outward from said volute chamber through the outlet port and against said heat load whereafter said heat load is cooled by the low-pressure, low-temperature gas, said gas thereafter being drawn back through said countercurrent heat exchanger to the compressor input to cool the incoming high pressure gas.

4. A closed cycle Joule-Thomson cryostat comprising: a compressor having an inlet and an outlet, said compressor continuously drawing, compressing and exhausting a supply of gas; a countercurrent heat exchanger connected to receive compressed gas from the outlet of said compressor and to supply expanded gas to the inlet of said compressor; a heat load connected in thermal communication with said countercurrent heat exchanger at an end opposite the compressor connection; and a throttle valve mounted adjacent the heat load, said throttle valve including a cylindrical volute chamber having a gas inlet slot formed through the side wall to tangentially intercept the inner side wall thereof and a gas outlet port formed in one end wall thereof to span the supersonic vortex region of said volute chamber, said volute chamber being connected to receive the compressed gas from said heat exchanger at the inlet passageway and to exhaust the gas through the outlet port whereby the gas within said volute chamber is accelerated into a vortex to reduce the gas pressure and gas temperature whereupon the low-pressure, low-temperature gas is directed outward from said volute chamber through the outlet port and against said heat load where after said heat load is cooled by the low-pressure, low-temperature gas, said gas thereafter being drawn back through said countercurrent heat exchanger to the compressor input to cool the incoming high pressure gas.

5. A closed cycle Joule-Thomson cryostat comprising: a compressor having an inlet and an outlet, said compressor continuously drawing, compressing, and exhausting a supply of gas; a Dewar flask having an inlet port and an outlet port at one end thereof and a heat conductor means connected through the other end thereof; a countercurrent heat exchanger mounted within said Dewar flask and connected to receive compressed gas from the outlet of said compressor and to supply expanded gas to the inlet of said compressor; a heat load connected in thermal communication with the outer surface of the heat conductor means; and a throttle valve mounted adjacent the heat load, said throttle valve including a cylindrical volute chamber having a gas inlet slot formed through the side wall to tangentially intercept the inner side wall thereof and a gas outlet port formed in one end wall thereof to span the supersonic vortex region of said volute chamber, said volute chamber being connected to receive the compressed gas from said heat exchanger at the inlet slot and to exhaust the gas through the outlet port whereby the gas passing through said volute chamber is accelerated into a vortex to reduce the gas pressure and gas temperature whereupon the low-pressure, low-temperature gas is directed outward from said volute chamber through the outlet port and against the heat conductor whereafter said heat load is cooled by the low-pressure, low-temperature gas, said gas thereafter being drawn back through said countercurrent heat exchanger to the compressor input to cool the incoming high pressure gas.

6. A closed cycle Joule-Thomson cryostat comprising: a compressor having an inlet and an outlet, said compressor continuously drawing, compressing and exhausting a supply of gas; a Dewar flask having an inlet and an outlet port formed through one end thereof and a heat conductor means formed through the other end thereof; a countercurrent heat exchanger mounted within said Dewar flask and connected through the inlet port to receive compressed gas from the outlet of said compressor and to supply expanded gas through the outlet port to the inlet of said compressor; a heat load connected in thermal communication with the outer surface of the heat conductor; and a throttle valve mounted adjacent the heat load, said throttle valve including a cylindrical volute chamber having a gas inlet slot formed concentrically through the side wall to tangentially intercept the inner side wall thereof and a gas outlet port formed in one end wall thereof to span the supersonic vortex region of said volute chamber, said volute chamber being connected to receive the compressed gas from the spiralled tube at the inlet slot and to exhaust the gas through the outlet port whereby the gas passing through said volute chamber is accelerated into a vortex to reduce the gas pressure and gas temperature whereupon the low-pressure, low-temperature gas is directed outward from said volute chamber through the outlet port and against the heat conductor whereafter said heat load is cooled by the low-pressure, low-temperature gas, said gas thereafter being drawn back through said countercurrent heat exchanger to the compressor input to cool the incoming high pressure gas.

7. A closed cycle Joule-Thomson cryostat comprising: a compressor having an inlet and an outlet, said compressor continuously drawing, compressing, and exhausting a supply of gas; a Dewar flask having a heat conducting surface at one end thereof; a countercurrent heat exchanger mounted within said Dewar flask and connected to receive compressed gas from the outlet of said compressor and to supply expanded gas to the inlet of said compressor; a heat load connected in thermal communication with the outer surface of the heat conducting surface; a throttle valve mounted adjacent the heat load, said throttle valve including a volute chamber having a gas inlet slot formed concentrically through the side wall to tangentially intercept the inner side wall thereof and a gas outlet port formed in one end wall thereof to span the supersonic vortex region of said volute chamber, said volute chamber being connected to receive compressed gas from the spiralled tube at the inlet slot and to exhaust the gas through the outlet port whereby the gas passing through said volute chamber is accelerated into a vortex to reduce the gas pressure and the gas temperature whereupon the low-pressure, low-temperature gas is directed outward from said volute chamber through the outlet port and against the heat conducting surface whereafter said heat load is cooled by the low-pressure, low-temperature gas, said gas thereafter being drawn back through said countercurrent heat exchanger to the compressor input to cool the incoming high pressure gas.

8. In a Joule-Thomson cryostat of the type having a pressurized supply of refrigerant gas for cooling a heat load, a throttle valve comprising: a cylindrical volute chamber having a gas inlet slot formed through the cylindrical side wall thereof and a gas outlet port formed in one end wall thereof being dimensioned to span only the supersonic region of the gas vortex, the inlet slot of said volute chamber being connected to receive the compressed refrigerant gas and the outlet port being adapted to exhaust gas from the volute chamber whereby the gas passing through said volute chamber is accelerated into a vortex to reduce the gas pressure and the gas temperature whereupon the low-pressure, low-temperature gas is directed outward from said volute chamber through the outlet port and against the heat load whereupon the heat load is cooled by the gas.

9. In a Joule-Thomson cryostat of the type having a pressurized supply of refrigerant gas for cooling a heat load, a throttle valve comprising: a cylindrical volute chamber having a gas inlet slot formed through the cylindrical side wall thereof to tangentially intercept the cylindrical inner wall of said chamber and a gas outlet port formed concentrically through one end wall thereof and dimensioned to span only the supersonic region of the gas vortex, the inlet slot of said volute chamber being connected in gas communication to receive the compressed refrigerant gas and the outlet port being adapted to exhaust gas from the volute chamber whereby the gas passing through said volute chamber is accelerated into a vortex to reduce the gas pressure and the gas temperature whereupon the low-pressure, low-temperature gas is directed outward from said volute chamber through the outlet port and against the heat load whereupon the heat load is cooled by the gas.

References Cited by the Examiner
UNITED STATES PATENTS

| | | | |
|---|---|---|---|
| 2,737,028 | 3/1956 | Machlanski | 62—5 |
| 3,057,166 | 10/1962 | Thompson | 62—5 |
| 3,064,451 | 11/1962 | Skinner | 62—259 |
| 3,152,475 | 10/1964 | Ford | 62—5 |

WILLIAM J. WYE, *Primary Examiner.*